United States Patent
Tsegelsky

(10) Patent No.: US 8,784,648 B2
(45) Date of Patent: Jul. 22, 2014

(54) METHOD FOR PRODUCING VACUUM IN A VACUUM OIL-STOCK DISTILLATION COLUMN AND A PLANT FOR CARRYING OUT THE METHOD

(76) Inventor: Valery Grigorievich Tsegelsky, Moscow (RU)

( * ) Notice: Subject to any disclaimer, the term of this patent is extended or adjusted under 35 U.S.C. 154(b) by 418 days.

(21) Appl. No.: 13/142,078

(22) PCT Filed: Jun. 24, 2009

(86) PCT No.: PCT/RU2009/000313
§ 371 (c)(1), (2), (4) Date: Jun. 24, 2011

(87) PCT Pub. No.: WO2010/074596
PCT Pub. Date: Jul. 1, 2010

(65) Prior Publication Data
US 2011/0253597 A1    Oct. 20, 2011

(30) Foreign Application Priority Data
Dec. 25, 2008 (RU) ................................. 2008151502

(51) Int. Cl.
*C10G 7/06* (2006.01)
*B01D 3/10* (2006.01)

(52) U.S. Cl.
USPC ........... 208/363; 208/353; 208/356; 208/357; 208/366; 203/27; 202/182; 202/205; 196/114; 417/76

(58) Field of Classification Search
USPC ......... 208/187, 347, 353, 356, 357, 362, 363, 208/366; 196/114; 203/11, 27, 96; 202/182, 202/205, 159; 417/76
See application file for complete search history.

(56) References Cited

U.S. PATENT DOCUMENTS

| | | | |
|---|---|---|---|
| 2,105,935 A | | 1/1938 | Swanson |
| 5,980,698 A | * | 11/1999 | Abrosimov et al. ............ 203/94 |
| 6,346,173 B2 | * | 2/2002 | Popov et al. .................... 203/91 |
| 6,348,134 B1 | * | 2/2002 | Popov ........................... 196/114 |
| 6,364,624 B1 | * | 4/2002 | Popov .............................. 417/54 |
| 6,398,918 B1 | * | 6/2002 | Popov ............................... 203/2 |
| 7,267,747 B2 | | 9/2007 | Musial |

FOREIGN PATENT DOCUMENTS

RU    2083638 C1    7/1997

* cited by examiner

Primary Examiner — Renee E Robinson
(74) Attorney, Agent, or Firm — Volpe and Koenig, P.C.

(57) ABSTRACT

A method is provided for producing vacuum in a vacuum oil-stock distillation column and includes pumping a gas-vapor medium out of a column by an ejector into a condenser; feeding a gas mixture and a high-pressure gas into a second gas-gas ejector from which the vapor-gas mixture is fed into a second condenser. A condensate is directed from the condensers into a separator in which the condensate is separated into a water-containing condensate and a hydrocarbon-containing condensate. The hydrocarbon-containing condensate is removed while the water-containing condensate is fed into a steam generator in which heat is supplied to the water-containing condensate from a hot distillate removed from the vacuum column and steam is produced from the water-containing condensate, the steam is fed as a high-pressure gas into the gas-gas ejectors. A plant for carrying out the method is also provided.

19 Claims, 1 Drawing Sheet

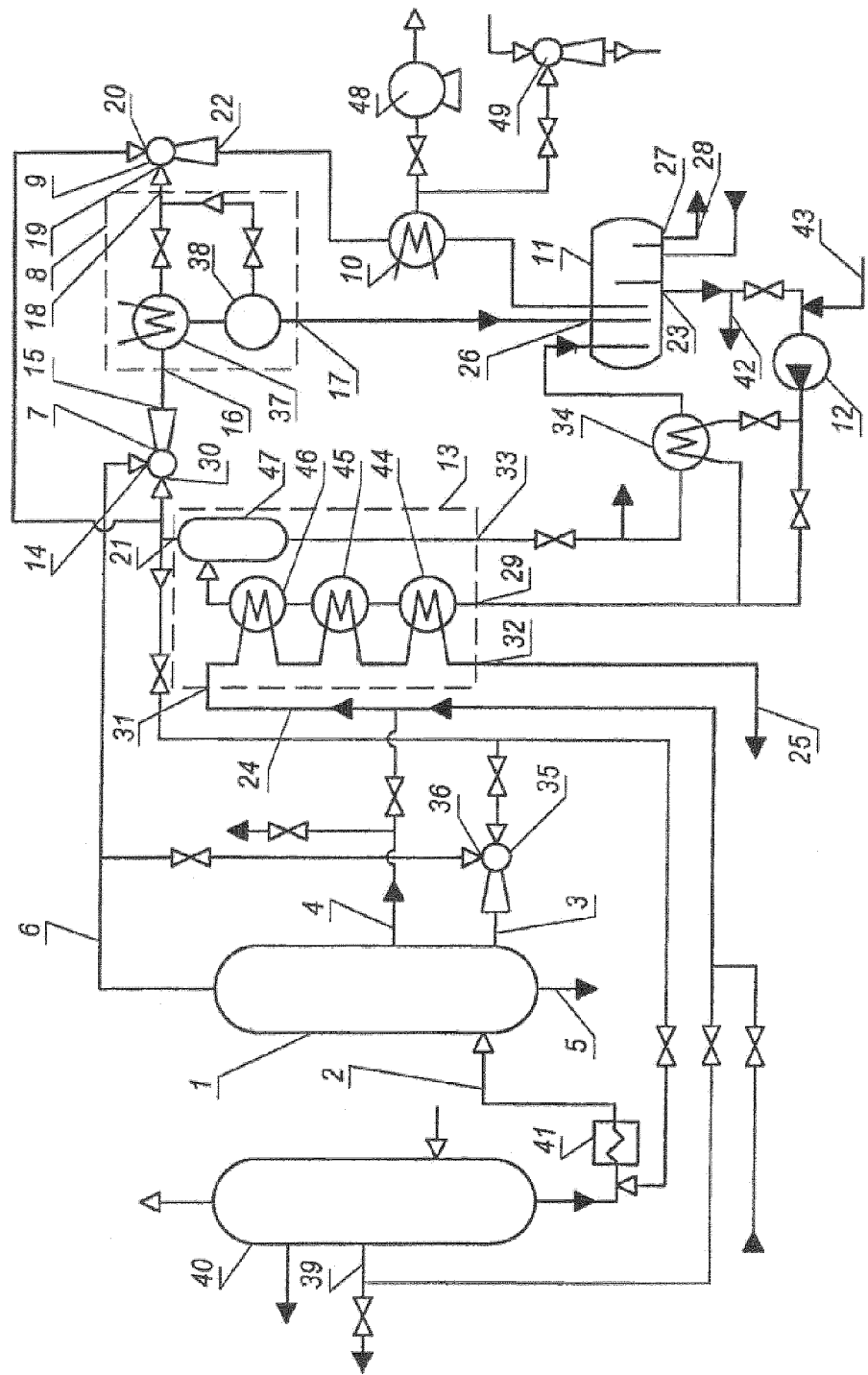

METHOD FOR PRODUCING VACUUM IN A VACUUM OIL-STOCK DISTILLATION COLUMN AND A PLANT FOR CARRYING OUT THE METHOD

CROSS REFERENCE TO RELATED APPLICATIONS

This application is a 371 National Phase of International Application No. PCT/RU2009/000313, filed Jun. 24, 2009, which claims priority to Russian Application No. 2008151502 filed Dec. 25, 2008, the entire contents of all of which are incorporated by reference as if fully set forth.

FIELD OF INVENTION

The invention relates to methods and plants for producing vacuum in a vacuum oil-stock distillation column with feeding a water steam into the vacuum column and/or into oil stock, and can be used in the oil refining industry for producing vacuum in a vacuum mazut distillation fractionator.

BACKGROUND

Known is a method for producing vacuum in a vacuum fractionating column for distilling oil stock (black oil) by pumping a gas-vapor medium with the help of a multi-stage vapor ejector pump which is fed with water steam as a high-pressure gas from an external source (see U.S. Pat. No. 2,105, 935 A1, IPC B01D 3/14, Jan. 18, 1938).

A plant for producing vacuum in a vacuum fractionating column for distilling oil stock is known from said patent, said plant comprising a pipe for drawing a gas-vapor medium off from the vacuum column, a condenser and a multi-stage vapor ejector pump, said multi-stage vapor ejector pump at its high-pressure gas inlet of the first compression stage being connected to an external source of water steam, and at its gas-vapor mixture outlet being connected to an inlet of a second compression stage.

The disadvantages of the prior art method and plant are use of the external source of water steam and drawing off the water steam condensate in the mixture with oil fractions out of the plant, said disadvantages resulting in environmental pollution and loss of the distillate.

The additional disadvantage is large power inputs associated with using a large quantity of steam and water for organization of the multi-stage process for compressing the gas-vapor medium and condensing vapor.

The closest prior art to the invention in part of the method as a subject-matter of the invention, in the technical essence and in the accomplished result is a method for producing vacuum in a vacuum column for distilling crude oil, said method comprising: pumping a gas-vapor medium out of the vacuum column by a gas-gas ejector by feeding a high-pressure gas thereto to generate a gas-vapor mixture at an outlet thereof with a pressure higher than that of the gas-vapor medium at an inlet thereto; feeding the gas-vapor mixture into a condenser followed by cooling thereof and generating a gas mixture and a vapor phase condensate; feeding the gas mixture and the high-pressure gas into a second gas-gas ejector to generate a gas-vapor mixture at an outlet thereof with a pressure higher than that of the gas mixture at an inlet thereto; feeding the gas-vapor mixture from the second gas-gas ejector into a second condenser followed by cooling thereof and generating a gas mixture and a vapor phase condensate at an outlet of the second condenser; and discharging the gas mixture out of the second condenser for a designated purpose (see U.S. Pat. No. 7,267,747, IPC B01D 3/10, Sep. 11, 2007).

The closest prior art to the invention in part of the apparatus as a subject-matter of the invention, in the technical essence and in the accomplished result is a plant for producing vacuum in a vacuum column for distilling an oil feed, said plant comprising: a pipeline for discharging a gas-vapor medium out of the vacuum column for distilling the oil feed; a gas-gas ejector; a condenser; a second gas-gas ejector; and a second condenser, wherein said gas-gas ejector is connected, at its low-pressure gas inlet, to the pipeline for discharging the gas-vapor medium out the vacuum column for distilling the oil feed and, at its gas-vapor mixture outlet, is connected to an inlet of the condenser that has a condensate outlet and a gas mixture outlet being connected to a gas mixture inlet of the second gas-gas ejector, said second gas-gas ejector is connected, at its gas-vapor inlet, to the second condenser that has its condensate inlet and gas mixture outlet (see U.S. Pat. No. 7,267,747, IPC B01D 3/10, Sep. 11, 2007).

The disadvantages of said method for producing vacuum in a vacuum column for distilling an oil feed (in particular, oil residue) and said plant for carrying out the same are large power inputs associated with using a large amount of water steam and water for organization of the multi-stage process of compressing the gas-vapor medium and inter-stage condensing the vapor. The use of an external source of water steam and discharge of the water steam condensate in mixture with oil fractions out of the plant are the disadvantages as well, said disadvantages resulting in environmental pollution and loss of the distillate.

SUMMARY

An object solved by the present invention is to generate a high-pressure gas from a water-containing medium during operation of the plant due to heat of the oil refining distillates or oil-stock distillates and to minimize the drain of a hydrocarbon-contaminated water-containing medium to environment by organization of its flow through a closed loop in the plant.

The technical result is a reduction of power inputs for production of vacuum, a decrease of environmental pollution, and exclusion of water steam consumption by a vacuum production plant, said steam being supplied to the plant from an external source.

In part of a method as a subject-matter of the invention, said object is solved and the technical result is achieved by a method for producing vacuum in a vacuum oil-stock distillation column, said method comprising: pumping a gas-vapor medium out of the vacuum column by a gas-gas ejector by feeding a high-pressure gas thereto with generation a gas-vapor mixture at an outlet thereof with a pressure higher than that of the gas-vapor medium at an inlet of the gas-gas ejector; feeding the gas-vapor mixture into a condenser followed by cooling thereof and generating a gas mixture and a vapor phase condensate; feeding the gas mixture and the high-pressure gas into a second gas-gas ejector with generation a gas-vapor mixture at an outlet thereof with a pressure higher than that of the gas mixture at an inlet of the second gas-gas ejector; feeding the gas-vapor mixture from the second gas-gas ejector into a second condenser followed by cooling thereof and generating a gas mixture and a vapor phase condensate at an outlet of the second condenser; and discharging the gas mixture out of the second condenser for a designated purpose, said vapor phase condensate generated in the condenser and in the second condenser being directed into a separator where the vapor phase condensate is separated into a water-containing condensate and a hydrocarbon-containing condensate, said hydrocarbon-containing condensate being discharged out of the separator for a designated purpose while said water-containing condensate being fed by a pump into a steam generator where heat from a hot distillate discharged out of the vacuum oil-stock distillation column or an oil refining column is supplied to the water-containing condensate and obtaining a steam from said water-containing condensate, and feeding said steam as a high-pressure gas into the gas-gas ejector and the second gas-gas ejector from the steam generator.

It is preferable to generate the steam in the steam generator at a pressure within a range of 0.2 to 0.6 MPa.

It is preferable to discharge a portion of the water-containing condensate, which was not evaporated in the steam generator, into the separator, and it is preferable to cool this portion of the water-containing condensate in a heat exchanger before it enters the separator.

Prior to feed for a designated purpose, the gas mixture from the second condenser can be preferably compressed in a liquid ring pump or in a third gas-gas ejector.

It is preferable to feed the steam from the steam generator further into the vacuum oil-stock distillation column and/or into the oil stock before it enters the vacuum column.

Before feeding the steam from the steam generator to the gas-gas ejector, to the second gas-gas ejector and/or the vacuum column, it is preferable to heat said steam further in a furnace due to heat of hot gases.

It is preferable to supply heat to the water-containing condensate in the furnace from hot gases exiting said furnace.

It is possible to feed the steam from the steam generator into the vacuum oil-stock distillation column via an additional gas-gas ejector; thus, the latter can further pump the gas-vapor mixture out of this vacuum oil-stock distillation column.

In part of a plant as a subject-matter of the invention, said object is solved and the technical result is achieved by a plant for producing vacuum in an vacuum oil-stock distillation column, said plant comprising: a pipeline for discharging a gas-vapor medium out of the vacuum oil-stock distillation column; a gas-gas ejector; a condenser; a second gas-gas ejector; and a second condenser, said gas-gas ejector is connected, at its low-pressure gas inlet, to the pipeline for discharging the gas-vapor medium out of the vacuum oil-stock distillation column and, at its gas-vapor mixture outlet, is connected to an inlet of the condenser that has a condensate outlet and a gas mixture outlet being connected to a gas mixture inlet of the second gas-gas ejector, said second gas-gas ejector is connected, at its gas-vapor mixture outlet, to the second condenser that has its condensate inlet and gas mixture outlet, wherein said plant is provided with: a pipeline for supplying an oil refining distillate or oil-stock distillate; a pipeline for discharging the oil refining distillate or oil-stock distillate out of the plant; a steam generator, a pump and a separator that is connected, at its inlet, to the condensate outlets of the condenser and the second condenser, wherein a hydrocarbon-containing condensate outlet of the separator is connected to a pipeline for discharging a hydrocarbon-containing condensate out of the plant and a water-containing condensate outlet of the separator is connected to an inlet of the pump which outlet is connected to a water-containing condensate inlet of the steam generator, a steam outlet of the steam generator is connected to high-pressure inlet of the gas-gas ejector and high-pressure inlet of the second gas-gas ejector, said steam generator being connected at its heating heat-transfer agent inlet to the pipeline for supplying the oil refining distillate or oil-stock distillate and being connected at its heating heat-transfer agent outlet to the pipeline for discharging the oil refining distillate or oil-stock distillate out of the plant.

The steam generator can have a non-evaporated condensate outlet being connected to the separator, wherein said non-evaporated condensate outlet of the steam generator can be connected to a non-evaporated condensate inlet thereto via a heat exchanger.

The steam outlet of the steam generator can further be connected to the vacuum oil-stock distillation column and/or to a pipeline for supplying oil-stock to this vacuum column.

The steam outlet of the steam generator can be connected to high-pressure gas inlets of the gas-gas ejector, of the second gas-gas ejector, and/or to the vacuum oil-stock distillation column via heat-exchanging pipes for heating the steam in a furnace.

An additional gas-gas ejector can be mounted in a steam supply pipeline to the vacuum column between the steam outlet of the steam generator and the steam inlet to the vacuum oil-stock distillation column, said additional gas-gas ejector is connected, at its low-pressure gas inlet, to the gas-vapor medium discharge pipeline of this vacuum column and is connected, at its steam inlet, to the steam outlet of the steam generator.

The condenser can consist of a vapor condensation apparatus and a phase separator, wherein an inlet of the vapor condensation apparatus is connected to the gas-vapor mixture outlet of the gas-gas ejector, a two-phase mixture outlet of the vapor condensation apparatus is connected to a two-phase mixture inlet of the phase separator which has a condensate outlet and a gas mixture outlet.

A gas mixture outlet of the second condenser can be connected to a gas mixture inlet of a liquid ring pump or a gas mixture inlet of a liquid-gas ejector.

The disclosed method and the plant for carrying out the same allow production of vacuum in the vacuum oil-stock distillation column by compressing gas-vapor medium to be pumped out in two stages with intermediate condensation of the vapor phase between the stages. At the same time, the major mass of an operating fluid (a steam of water-containing condensate) of a high-pressure flow (ejecting flow) entering both the gas-gas ejector and the second gas-gas ejector circulates along the closed loop in each compression stage. A relative small substitution of the circulating operating fluid takes place due to the condensate of the vapor phase present in the gas-vapor medium pumped out of the vacuum oil-stock distillation column. A small substitution of the circulating operating fluid from an external source is possible.

All these measures decrease environmental pollution and improve the ecological safety of the plant for producing vacuum in the vacuum oil-stock distillation column.

The steam obtained in the steam generator from the water-containing condensate generated within the separator in process of separating the vapor phase condensate present therein into the water-containing and hydrocarbon-containing condensates is fed as a high-pressure gas into the first compression stage including the gas-gas ejector and into the second compression stage including the second gas-gas ejector.

The water-containing condensate is a water condensate in case of complete separation of phases within an additional separator, or a mixture of a water condensate with a small quantity of a hydrocarbon condensate in case of incomplete separation of phases. To produce vacuum in a mazut distillation fractionator with feeding water steam thereto, it is more effective to use a water condensate steam as a high-pressure gas fed into the gas-gas ejector and into the second gas-gas ejector while separating said water condensate within the separator as completely as possible from the hydrocarbon condensate discharged out of the plant.

This is associated with the fact that the gas-vapor medium pumped out of the vacuum column contains a sufficiently large quantity of water steam which requires large power inputs for compression thereof. To compress such a gas-vapor medium effectively, it is desirable to feed a water condensate steam as a high-pressure gas into the gas-gas ejector and the second gas-gas ejector, said water condensate steam having large specific operability as compared to a hydrocarbon condensate vapor or in extremis a mixture of said two components—the steam and the vapor—with a small content of the latter. The steam generated in the steam generator from the water-containing condensate will be further referred to as water steam.

It is possible to use a special filter mounted downstream of the separator in order to provide more complete separation of hydrocarbons from the water condensate.

The water-containing condensate circulates through the following loop at the first compression stage of vacuum production plant:

the water-containing condensate is fed by the pump from the separator into the steam generator where it is transformed into steam due to supply of heat from the hot distillate of the oil refining column or the vacuum oil-stock distillation column;

the steam from the steam generator enters the gas-gas ejector as a high-pressure gas and compresses the gas-vapor medium from the column pressure of 0.6 to 6.0 kPa up to the gas-vapor mixture pressure of 3.5 to 11.5 kPa at the inlet of the condenser;

the gas-vapor mixture is cooled in the condenser using a cooling agent having an initial temperature of 5° C. to 35° C. and is separated into a gas mixture and a condensate of the vapor phase dropped out of the gas-vapor mixture in process of cooling thereof;

the vapor phase condensate, which is a mixture of the water condensate and the hydrocarbon condensate, drains into the separator;

the vapor phase condensate is separated into the water-containing condensate and the hydrocarbon-containing condensate in the separator;

the water-containing condensate is fed from the separator to the inlet of the pump and further into the steam generator while the hydrocarbon-containing condensate and the excess of the water-containing condensate generated due to the water steam condensate entering the condenser from the vacuum oil-stock distillation column are discharged out of the plant.

The water-containing condensate circulates through the following loop at the second compression stage of the vacuum production plant:

the water-containing condensate is fed by the pump from the separator into the steam generator where it is transformed into steam due to supply of heat from the hot distillate of the oil refining column or the vacuum oil-stock distillation column;

the steam from the steam generator enters the second gas-gas ejector as a high-pressure gas and compresses the gas-vapor mixture from the pressure of 3.0 to 11.0 kPa up to the gas-vapor mixture pressure at the outlet of said ejector, and this mixture is fed into the second condenser;

the gas-vapor mixture is cooled in the second condenser using a cooling agent having an initial temperature of 20° C. to 40° C. and is separated into a gas mixture and a condensate of the vapor phase dropped out of the gas-vapor mixture in process of cooling thereof;

the vapor phase condensate, which is a mixture of water condensate with the hydrocarbon condensate, flows down in the separator;

the vapor phase condensate is separated into the water-containing condensate and the hydrocarbon-containing condensate in the separator;

as noted above, the water-containing condensate is fed to the inlet of the pump and further into the steam generator while the hydrocarbon-containing condensate and the excess of the water-containing condensate generated due to the water steam condensate entering the condenser from the vacuum oil-stock distillation column are discharged out of the plant.

Circulation of the water-containing condensate and generation of water steam from it due to heat of the hot distillate discharged out of the oil refining column or discharged out of the vacuum oil-stock distillation column excludes a consumption of water steam from an external source by the vacuum production plant. All these operations as well as implementation of two-state compression of the pumped-out gas-vapor medium with intermediate condensation of the vapor phase between the stages result in reduction of power inputs for production of vacuum.

It is also expedient to feed the oil refining distillate or oil-stock distillate as a heating heat-transfer agent into the steam generator; heat of said distillate is discharged (released) to environment. In oil refining, such heat presents in distillates discharged out of the vacuum oil-stock distillation column or discharged out of the oil refining column and directed to circulation reflux of columns, and also in distillates output from the distillation process with a temperature of 130° C. to 180° C. that makes the steam generator able to produce steam at a pressure of 0.2 MPa to 0.6 MPa.

In case if not entire water-containing condensate evaporates in the steam generator, it is expedient to discharge the non-evaporated portion thereof into the separator. This can take place in case of incomplete phase separation in the separator and at the presence of high-boiling hydrocarbons in the water-containing condensate, or in case if steam is generated in the steam generator by instantaneous boiling within the volume of the condensate overheated relative to a saturated water steam temperature being in equilibrium with a water steam pressure in said volume.

In case if a significant quantity of the non-evaporated water-containing condensate is discharged out of the steam generator into the separator, it is expedient to return its heat via a heat exchanger to the water-containing condensate entering the steam generator; this makes it possible to save heat.

A portion of (water) steam from the steam generator can enter the gas-gas ejector as a high-pressure gas while another portion of (water) steam can enter the vacuum oil-stock distillation column and/or oil stock heated in the furnace before it enters the vacuum column.

This shortens the consumption of water steam from an external source in vacuum distillation of oil stock, thereby is reduces power inputs for distillation and decreases environmental pollution.

Water steam exiting the steam generator can be additionally heated in the furnace due to heat of hot gases. This improves the energy output of steam. It is possible to supply heat to the water-containing condensate in the furnace from hot effluent gases, which allows increase in consumption of the generated water steam.

A portion of water steam from the steam generator can enter the vacuum oil-stock distillation column via an additional gas-gas ejector being connected, at its high-pressure gas inlet, to the pipeline for discharging the gas-vapor phase out of this column. This allows reduction in both the quantity of water steam fed from the steam generator into the vacuum column and the consumption of the gas-vapor mixture into the gas-gas ejector. The latter factor results in reduction of the water steam consumption from the steam generator to the gas-gas ejector. All these reduce the condenser heat load, decrease overall dimensions of the condenser, and lower power inputs.

The condenser can comprise a phase separator separating the two-phase mixture supplied thereto from a vapor condensation apparatus (a condensation zone) into the vapor phase condensate and the gas mixture, wherein a gas mixture outlet of the phase separator is connected to a gas mixture inlet of the second gas-gas ejector while a vapor phase condensate outlet of the phase separator is connected to a vapor phase condensate inlet of the separator.

Use of the phase separator makes it possible to increase the quality of the process for separating the gas mixture not condensed in the condenser from the vapor phase condensate dropped out of the gas-vapor mixture in process of cooling thereof.

BRIEF DESCRIPTION OF THE DRAWING

The single FIGURE is a diagram of a plant for producing vacuum in a vacuum oil-stock distillation column.

DETAILED DESCRIPTION OF THE PREFERRED EMBODIMENTS

The drawing is a diagram of a plant for producing vacuum in a vacuum oil-stock distillation column 1 with a pipeline 2 for supplying oil stock connected thereto, a pipeline 3 for supplying water steam, a pipeline 4 for discharging a distillate out of the vacuum column 1, a pipeline 5 for discharging a distillation residue, and a pipeline 6 for discharging a gas-vapor medium. The vacuum production plant includes a gas-gas ejector 7, a condenser 8, a second gas-gas ejector 9, a second condenser 10, a separator 11, a pump 12, and a steam generator 13.

The gas-gas ejector 7 is connected, at its low-gas inlet 14, to the pipeline 6 for discharging a gas-vapor medium out of the vacuum column 1, and is connected, at its gas-vapor mixture outlet 15, to an inlet 16 of the condenser 8 that has a vapor phase condensate outlet 17 and a gas mixture outlet 18 being connected to a gas mixture inlet 19 of the second gas-gas ejector 9 which is connected, at its high-pressure gas inlet 20, to a steam outlet 21 of the steam generator 13 and is connected, at its gas-vapor mixture outlet 22, to a gas-vapor mixture inlet of the second condenser 10. A vapor phase condensate outlet of the condenser 10 is connected to the separator 11 having a water-containing condensate outlet 23.

The plant is provided with a pipeline 24 for supplying an oil refining distillate or oil-stock distillate and a pipeline 25 for discharging the oil refining distillate or oil-stock distillate out of the plant.

The separator 11 is connected, at its inlet 26, to the vapor phase condensate outlet 17 of the condenser 8, is connected, at its hydrogen-containing condensate outlet, to a pipeline 28 for discharging a hydrogen-containing condensate out of the plant, and is connected, at its water-containing condensate outlet 23, to an inlet of the pump 12. The outlet of the pump 12 is connected to a water-containing condensate inlet 29 of the steam generator 13; the steam outlet 21 of the steam generator 13 is connected to a high-pressure gas inlet 30 of the gas-gas ejector 7.

The steam generator 13 is connected at its heating heat-transfer agent inlet 31 to the pipeline for supplying the oil refining distillate or oil-stock distillate, and is connected at its heating heat-transfer agent outlet 32 to the pipeline 25 for discharging the oil refining distillate or oil-stock distillate out of the plant.

The steam generator 13 can have a non-evaporated condensate outlet 33 being connected to the separator 11.

A heat exchanger 34 can be mounted between the non-evaporated condensate outlet 33 of the steam generator and a non-evaporated condensate inlet of the separator 11.

The steam outlet 21 of the steam generator 13 can further be connected to the pipeline 3 for supplying steam to the vacuum column 1 and/or to the pipeline 2 for supplying oil-stock thereto.

An additional gas-gas ejector 35 can be mounted in the pipeline 3 for supplying water steam to the vacuum column 1, said additional gas-gas ejector is connected, at its low-pressure gas inlet 36, to the pipeline 6 for discharging the gas-vapor medium out of the vacuum column 1.

The condenser 8 can comprise a vapor condensation apparatus 37 and a phase separator 38 connected thereto and separating the two-phase mixture entering therein into a condensate and a gas mixture.

The pipeline 24 for supplying distillate to the steam generator 13 can be connected to the pipeline 4 for discharging the distillate out of the vacuum column 1 or to a pipeline 39 for discharging the distillate out of an oil refining column 40 under an excessive or atmospheric pressure. A furnace 41 can be mounted in the pipeline 2 for supplying oil stock to the vacuum column 1 in order to heat the oil stock up.

It is possible to discharge the water-containing condensate out of the plant through a pipeline 42 and it is possible to supply water or the water condensate through a pipeline 43 into the plant in case of deficiency in the water-containing condensate.

The steam generator 13 can be structurally embodied in different ways and consist of a number of members, for example, an economizer 44, an evaporator 45, a steam heater 46, a non-evaporated condensate separator 47, and other members connected between each other. However, any constructions of the steam generator 13 consisting of different numbers of members connected together are designed to achieve the same aim, exactly, to produce steam from the water-containing condensate by supplying heat thereto from the hot distillate fed through the pipeline 24 and passing through the steam generator 13.

The gas mixture outlet of the second condenser 10 can be connected to a gas inlet of the liquid ring pump 48 or to a gas inlet of a gas-liquid ejector 49 fed with an operating fluid (for example, a hydrogen-containing fraction, water or other liquid) as a high-pressure flow by an additional pump (not shown in the drawing). It is possible to use a third gas-gas ejector instead of the gas-liquid ejector 49, said third gas-gas ejector being fed with water steam.

The operation of the plant for implementation of the inventive method by the example of distilling mazut as oil stock.

Oil stock (mazut) is heated in the furnace 41 and passes in the liquid-vapor form through the pipeline 2 into the vacuum column 1 for distillation at a top pressure of 0.6 to 6.0 kPa. Water steam is fed into the vacuum column 1 through the pipeline 3. The water steam can enter the vacuum oil-stock distillation column 1 together with the oil stock through the pipeline 2. A distillate (for example, vacuum gas-oil) is discharged as a side-cut distillate out of the vacuum column 1, while a distillation residue (oil tar) is discharged out of the bottom of the column through the pipeline 5. The gas-vapor medium, which is a mixture of a gas, vapors of light hydrocarbon fractions and water steam, is discharged via the top of the vacuum column 1 through the pipeline 6.

The gas-vapor medium from the vacuum column 1 enters the gas-gas ejector 7 fed via the inlet 30 with (water) steam as a high-pressure gas from the steam generator 13. Water steam pumps out and compresses the gas-vapor medium which enters as a low-pressure gas the inlet 14 of the gas-gas ejector 7. Compression occurs due to a transmission of kinetic energy from the high-pressure gas (water steam) to low-pressure gas during mixing thereof into the gas-gas ejector 7. As a result, the gas-vapor mixture pressure at the outlet of the ejector 7 becomes higher that the gas-vapor medium pressure at the inlet thereto.

The gas-vapor mixture goes from the ejector 7 to the inlet 16 of the condenser 8 in which it is cooled by heat transfer through a wall to the cooling agent, for example water at an initial temperature of 5° C. to 35° C. In process of cooling the gas-vapor mixture, a vapor phase condensate drops out, wherein said vapor phase condensate is a mixture of water steam condensate and a condensate of hydrocarbon vapors present in the gas-vapor mixture. The vapor phase condensate is separated from the gas mixture (a non-condensed portion of the gas-vapor mixture) in the condenser 8. To provide better separation of the vapor phase condensate from the gas mixture, the condenser 8 can consist of the phase separator 38 and the vapor condensation apparatus 37 connected thereto.

The vapor phase condensate passes from the separator 8 via the outlet 17 to the separator 11.

The vapor phase condensate is separated into a water-containing condensate (a water condensate in case of 100% phase separation) and a hydrocarbon-containing condensate (a hydrocarbon condensate in case of 100% phase separation) in the separator 11. The hydrocarbon-containing condensate is outputted from the separator 11 via the outlet 27 to the pipeline 28 for discharging the hydrocarbon-containing condensate out of the plant, while the water-containing condensate is pumped out via the outlet 23 by the pump 12 and is fed to the inlet 29 of the steam generator 13. The excess of the water-containing condensate is discharged out of the plant through the pipeline 42. Heat from the heating heat-transfer agent is supplied to the water-containing condensate in the steam generator 13, and (water) steam is generated from said condensate and is fed as a high-pressure (ejection) gas into the gas-gas ejector 7. The heating heat-transfer agent passes to the inlet 31 of the steam generator 13 through the pipeline 24 for supplying the oil refining distillate or oil-stock distillate. At the same time, the pipeline 24 can be connected to the pipeline 39 for discharging the distillate out of the oil refining (oil-stock distillation) column 40 or to the pipeline 4 for discharging the distillate out of the vacuum oil-stock distillation column 1.

The heating heat-transfer agent, which was used in the steam generator 13 is discharged via the outlet 32 to the pipeline 25 for discharging the oil refining distillate or oil-stock distillate out of the plant (it is further possible to return said agent as a circulation reflux (not shown in the drawing) into the column).

In case if not the entire water-containing condensate evaporated in the steam generator 13, a non-evaporated portion of said condensate is separated from steam, for example in the non-evaporated condensate separator 47, and is discharged via the outlet 33 out of the steam generator 13 into the separator 11. If a flow of the non-evaporated condensate is large, it is possible to mount the heat exchanger 34 between the non-evaporated condensate outlet 33 of the steam generator 13 and the non-evaporated condensate inlet of the separator 11. At the same time, it is expedient to pump the water-containing condensate, which enters the steam generator 13, as a cooling liquid through the heat exchanger 34. This makes it possible to recover the heat of the non-evaporated condensate to the steam generator 13.

The gas mixture at a pressure of 3.5 to 11.5 kPa passes from the first compression stage, namely, from the condenser 8 via the outlet 18 to the inlet 19 of the second gas-gas ejector 9 of the second compression stage. The gas mixture is a mixture of gas and vapors of light hydrocarbons and water steam, which were not condensed in the condenser 8. The gas mixture is compressed in the second gas-gas ejector 9 due to energy of steam (the high-pressure gas) supplied thereto via the inlet 20 of the steam generator 13.

As a result of energy transfer from the high-pressure gas to the gas mixture in progress of their mixing, the gas-vapor mixture is generated at the outlet of the second gas-gas generator 9 at a pressure higher than the gas mixture pressure at the inlet to the second gas-gas ejector 9. The generated gas-vapor mixture enters the second condenser 10.

The generated gas-vapor mixture is separated into a compressed gas mixture and a vapor phase condensate in the second condenser 10. The compressed gas mixture is discharged out of the second condenser 10 for a designated purpose while the vapor phase condensate enters the condenser 11 thereby to close the water-containing condensate circulation loop at the second compression stage. If necessary, the compressed gas mixture discharged out of the second condenser 10 can be further compressed using the liquid ring pump 48 or the gas-liquid ejector 49. It is possible to use a third gas-gas ejector instead of the gas-liquid ejector 49.

A portion of water steam can pass from the steam generator 13 into the gas-gas ejector 7 and into the second gas-gas ejector 9 while another portion of said steam can pass to the pipeline 3 for supplying water steam to the vacuum column 1 and/or to the pipeline 2 for supplying oil stock.

The additional gas-gas ejector 35 can be mounted in the pipeline 3 for the water steam supply from the steam generator 13 to the vacuum column 1, said additional ejector is connected, at its low-pressure gas inlet, to the pipeline 6 for discharging the gas-vapor mixture out of the vacuum column 1. In this case, water steam fed as a high-pressure gas into the ejector 35 will pump a portion of the gas-vapor medium, which contains water steam, out of the pipeline 6 and return it again into the vacuum column 1. This makes it possible to decrease both the quantity of water steam fed from the steam generator 13 to the vacuum column 1 and the consumption of the gas-vapor medium entering the inlet 14 of the gas-gas ejector 7.

The steam outlet 21 of the steam generator 13 can be connected to the high-pressure gas inlet of the gas-gas ejector 7 and of the second gas-gas ejector 9 and/or to the vacuum oil-stock distillation column 1 via the heat exchanging pipes for heating gas (steam) in the furnace 41.

The claimed method and the plant for implementing the same make it possible to solve the actual problems of the oil-refining industry as follows:

to implement the ecologically pure procedure for producing vacuum in a vacuum oil-stock distillation column;

to reduce power inputs for production of vacuum;

to exclude consumption of water steam, which is supplied from an external source, by the vacuum production plant.

The disclosed method and apparatus as subject-matters of the invention can be used to produce vacuum in an vacuum column for distilling stock different from oil stock, for example in the petrochemical industry or the chemical industry.

The invention claimed is:

1. A method for producing vacuum in a vacuum oil-stock distillation column, said method comprising:
    pumping a gas-vapor medium out of the vacuum column by a gas-gas ejector by feeding a high-pressure gas thereto with generation of a gas-vapor mixture at an outlet of the gas-gas ejector with a pressure higher than that of the gas-vapor medium at an inlet of the gas-gas ejector;
    feeding the gas-vapor mixture into a condenser followed by cooling thereof and generating a gas mixture and a vapor phase condensate;
    feeding the gas mixture and the high-pressure gas into a second gas-gas ejector with generation a gas-vapor mixture at an outlet thereof with a pressure higher than that of the gas mixture at an inlet of the second gas-gas ejector;
    feeding the gas-vapor mixture from the second gas-gas ejector into a second condenser followed by cooling thereof and generating a gas mixture and a vapor phase condensate at an outlet of the second condenser; and
    discharging the gas mixture out of the second condenser for a designated purpose, said method further comprising directing the vapor phase condensate generated in the condenser and in the second condenser into a separator where the vapor phase condensate is separated into a water-containing condensate and a hydrocarbon-containing condensate;
    discharging the hydrocarbon-containing condensate out of the separator for a designated purpose while feeding said water-containing condensate by a pump into a steam generator where heat from a hot distillate discharged out of the vacuum oil-stock distillation column or an oil refining column is supplied to the water-containing condensate and obtaining a steam from said water-containing condensate, and
    feeding said steam as a high-pressure gas into the gas-gas ejector and the second gas-gas ejector from the steam generator.

2. The method according to claim 1, further comprising generating the steam in the steam generator at a pressure within a range of 0.2 to 0.6 MPa.

3. The method according to claim 1, further comprising discharging a water-containing condensate portion, which was not evaporated in the steam generator, into the separator.

4. The method according to claim 3, further comprising cooling the water-containing condensate portion, which was not evaporated in the steam generator, in a heat exchanger before it enters the separator.

5. The method according to claim 1, further comprising additionally feeding the steam from the steam generator into the vacuum oil-stock distillation column and/or into oil stock before it enters the vacuum column.

6. The method according to claim 5, further comprising feeding the steam from the steam generator into the vacuum oil-stock distillation column via an additional gas-gas ejector and further pumping, by the latter, the gas-vapor medium out of the vacuum oil-stock distillation column.

7. The method according to claim 1, further comprising feeding the steam produced in the steam generator to a furnace, additional heating of this steam in the furnace using heat of hot gases and feeding said steam from the furnace into the gas-gas ejector, and into the second gas-gas ejector and/or the vacuum oil-stock distillation column.

8. The method according to claim 1, further comprising compressing the gas mixture from the second condenser prior to feeding said mixture for a designated purpose.

9. The method according to claim 8, further comprising compressing the gas mixture from the second condenser in a liquid ring pump prior to feeding said mixture for the designated purpose.

10. The method according to claim 8, further comprising compressing the gas mixture from the second condenser in a liquid-gas ejector prior to feeding said mixture for the designated purpose.

11. A plant for producing vacuum in a vacuum oil-stock distillation column, said plant comprising:
    a pipeline for evacuating a gas-vapor medium out of the vacuum oil-stock distillation column;
    a gas-gas ejector, at a low-pressure gas inlet thereof to the pipeline for evacuating the gas-vapor medium from the vacuum oil-stock distillation column and connected, at a gas-vapor mixture outlet thereof, to an inlet of a condenser,
    the condenser having a condensate outlet and a gas mixture outlet connected to a low-pressure gas inlet of a second gas-gas ejector,
    the second gas-gas ejector connected, at a gas-vapor mixture outlet thereof to an inlet of a second condenser,
    the second condenser having a condensate outlet and a gas mixture outlet, said plant further comprising:
    a pipeline for supplying an oil refining distillate or oil-stock distillate;
    a pipeline for evacuating the oil refining distillate or oil-stock distillate from the plant;
    a separator having:
        an inlet connected to the condensate outlet of the condenser,
        an inlet connected to the condensate outlet of the second condenser,
        a hydrocarbon-containing condensate outlet connected to a pipeline for evacuation of a hydrocarbon-containing condensate from the plant, and
        a water-containing condensate outlet connected to an inlet of a pump;
    the pump having an outlet connected to a water-containing condensate inlet of a steam generator,
    the steam generator having:
    a steam outlet connected to a high-pressure gas inlet of the gas-gas ejector and to a high-pressure gas inlet of the second gas-gas ejector,
    a heating heat-transfer agent inlet connected to the pipeline for supplying the oil refining distillate or oilstock distillate, and
    a heating heat-transfer agent outlet connected to the pipeline for evacuating the oil refining distillate or oil-stock distillate from the plant.

12. The plant according to claim 11, wherein the steam generator has a non-evaporated condensate outlet, which is connected to the separator.

13. The plant according to claim 12, wherein the non-evaporated condensate outlet of the steam generator is connected via a heat exchanger to a non-evaporated condensate inlet of the separator.

14. The plant according to claim 11, wherein the steam outlet of the steam generator is additionally connected to the vacuum oil-stock distillation column and/or to the pipeline for supplying oil-stock to this vacuum column.

15. The plant according to claim 11, wherein an additional gas-gas ejector connected, at a low-pressure gas inlet thereof to the pipeline for evacuating gas-vapor medium from the vacuum oil-stock distillation column, and is connected, at a steam inlet thereof to the steam outlet of the steam generator and is connected at a gas-vapor mixture outlet thereof to the vacuum column.

16. The plant according to claim 11, wherein the condenser consists of a vapor condensation apparatus and a phase separator, wherein an inlet of the vapor condensation apparatus is connected to the gas-vapor mixture outlet of the gas-gas ejector, a two-phase mixture outlet of the vapor condensation apparatus is connected to an inlet of the phase separator having a condensate outlet and a gas mixture outlet.

17. The plant according to claim 11, wherein the gas mixture outlet of the second condenser is connected to a gas mixture inlet of a liquid ring pump.

18. The plant according to claim 11, wherein the gas mixture outlet of the second condenser is connected to a gas mixture inlet of a gas-liquid ejector.

19. The plant according to claim 11 wherein the steam outlet of the steam generator is connected to the high-pressure gas inlet of the gas-gas ejector and to the high-pressure inlet of the second gas-gas ejector and/or to the vacuum oil-stock distillation column via heat exchanging pipes for heating gas in a furnace.

\* \* \* \* \*